United States Patent
Desai (10) Patent No.: US 12,506,694 B2
(45) Date of Patent: *Dec. 23, 2025

(54) STREAM ALLOCATION USING STREAM CREDITS

(71) Applicant: EMC IP Holding Company LLC, Hopkinton, MA (US)

(72) Inventor: Keyur B. Desai, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,988

(22) Filed: Feb. 9, 2024

(65) Prior Publication Data

US 2024/0187351 A1 Jun. 6, 2024

Related U.S. Application Data

(63) Continuation of application No. 17/532,476, filed on Nov. 22, 2021, now Pat. No. 11,936,568, which is a continuation of application No. 16/154,475, filed on Oct. 8, 2018, now Pat. No. 11,201,828.

(51) Int. Cl.
| | |
|---|---|
| *H04L 47/10* | (2022.01) |
| *H04L 47/80* | (2022.01) |
| *H04L 65/612* | (2022.01) |
| *H04L 65/80* | (2022.01) |

(52) U.S. Cl.
CPC ............ *H04L 47/39* (2013.01); *H04L 47/806* (2013.01); *H04L 65/612* (2022.05); *H04L 65/80* (2013.01)

(58) Field of Classification Search
CPC ..... H04L 47/39; H04L 47/806; H04L 65/612; H04L 65/80

USPC .......................................................... 709/232
See application file for complete search history.

(56) References Cited

U.S. PATENT DOCUMENTS

| | | |
|---|---|---|
| 3,350,702 A | 10/1967 | Herman |
| 5,453,982 A | 9/1995 | Pennington et al. |
| 5,586,121 A | 12/1996 | Moura et al. |
| 5,778,320 A | 7/1998 | Drozt et al. |
| 5,812,545 A | 9/1998 | Liebowitz et al. |
| 5,889,956 A | 3/1999 | Hauser et al. |

(Continued)

FOREIGN PATENT DOCUMENTS

| | | |
|---|---|---|
| CN | 101211289 A | 7/2008 |
| CN | 102655503 A | 9/2012 |

(Continued)

OTHER PUBLICATIONS

Merriam-Webster's Collegiate Dictionary 1282 (prefix def. 1), 1030 (adj. def. 2a (10th ed. 1993) (Year: 1993).*

(Continued)

*Primary Examiner* — David P Zarka
(74) *Attorney, Agent, or Firm* — Workman Nydegger (57) ABSTRACT

Systems and methods for allocating resources are disclosed. Resources such as streams are allocated using a stream credit system. Credits are issued to the clients in a manner that ensure the system is operating in a safe allocation state. The credits can be used not only to allocate resources but also to throttle clients where necessary. Credits can be granted fully, partially, and in a number greater than a request. Zero or negative credits can also be issued to throttle clients.

20 Claims, 5 Drawing Sheets

(56) References Cited

U.S. PATENT DOCUMENTS

| | | | |
|---|---|---|---|
| 5,956,321 | A | 9/1999 | Yao et al. |
| 6,438,141 | B1 | 8/2002 | Hanko et al. |
| 6,459,901 | B1 | 10/2002 | Chawla et al. |
| 6,467,024 | B1 | 10/2002 | Bish et al. |
| 6,502,165 | B1 | 12/2002 | Kishi et al. |
| 7,269,697 | B1 | 9/2007 | Reeve et al. |
| 7,461,236 | B1 | 12/2008 | Wentzlaff |
| 7,478,158 | B1 | 1/2009 | Rodgers et al. |
| 7,539,735 | B2 | 5/2009 | Fruchtman et al. |
| 7,583,658 | B1 | 9/2009 | Wang et al. |
| 7,685,306 | B2 | 3/2010 | McEnroe et al. |
| 7,698,115 | B2 | 4/2010 | Voellm et al. |
| 7,707,248 | B2 | 4/2010 | Simard et al. |
| 8,306,036 | B1 | 11/2012 | Bollay |
| 8,381,217 | B1 | 2/2013 | Wijayaratne et al. |
| 8,400,924 | B2 | 3/2013 | Wang et al. |
| 9,477,997 | B2 | 10/2016 | Ben-Natan et al. |
| 9,619,127 | B2 | 4/2017 | Varner et al. |
| 10,652,796 | B2 | 5/2020 | Laliberte |
| 10,798,140 | B1* | 10/2020 | Mercier ............. H04L 65/612 |
| 11,201,828 | B2* | 12/2021 | Desai .................. H04L 47/806 |
| 11,936,568 | B2* | 3/2024 | Desai .................... G06F 3/067 |
| 2002/0053011 | A1 | 5/2002 | Aiken et al. |
| 2003/0158913 | A1 | 8/2003 | Agnoli et al. |
| 2004/0139207 | A1 | 7/2004 | De Jong |
| 2004/0165598 | A1 | 8/2004 | Shrimali et al. |
| 2004/0267932 | A1 | 12/2004 | Voellm et al. |
| 2005/0068911 | A1* | 3/2005 | Miyake ................ H04W 8/04 370/299 |
| 2006/0179182 | A1 | 8/2006 | Chadha et al. |
| 2007/0015525 | A1 | 1/2007 | Beming et al. |
| 2007/0118653 | A1 | 5/2007 | Bindal |
| 2007/0220262 | A1 | 9/2007 | Suzuki et al. |
| 2008/0034021 | A1 | 2/2008 | De Spiegeleer |
| 2008/0126606 | A1 | 5/2008 | Wang et al. |
| 2008/0134173 | A1* | 6/2008 | Abbondanzio ....... G06F 9/5077 718/1 |
| 2008/0155553 | A1 | 6/2008 | Astigarraga et al. |
| 2008/0307094 | A1 | 12/2008 | Karonen et al. |
| 2009/0138616 | A1 | 5/2009 | Alvarez et al. |
| 2009/0171812 | A1* | 7/2009 | Fadell ................ G06Q 30/0601 705/26.1 |
| 2009/0178050 | A1 | 7/2009 | Bichler et al. |
| 2010/0031157 | A1* | 2/2010 | Neer ..................... G06Q 10/06 715/738 |
| 2011/0032947 | A1 | 2/2011 | Brueggen |
| 2011/0184998 | A1 | 7/2011 | Palahnuk et al. |
| 2012/0096167 | A1 | 4/2012 | Free et al. |
| 2012/0226712 | A1 | 9/2012 | Vermeulen et al. |
| 2012/0281708 | A1 | 11/2012 | Chauhan et al. |
| 2012/0327779 | A1 | 12/2012 | Gell et al. |
| 2013/0055279 | A1 | 2/2013 | Sistare |
| 2013/0061233 | A1 | 3/2013 | Zhou et al. |
| 2013/0097680 | A1 | 4/2013 | Bendapudi et al. |
| 2013/0122858 | A1 | 5/2013 | Bedingfield et al. |
| 2013/0128082 | A1 | 5/2013 | Kiyosawa et al. |
| 2013/0159532 | A1 | 6/2013 | Boero et al. |
| 2013/0191929 | A1 | 7/2013 | Yin et al. |
| 2013/0232503 | A1 | 9/2013 | Volvovski et al. |
| 2013/0297857 | A1 | 11/2013 | Sela |
| 2014/0101113 | A1 | 4/2014 | Zhang et al. |
| 2014/0195688 | A1 | 7/2014 | Archer et al. |
| 2015/0007189 | A1 | 1/2015 | De et al. |
| 2015/0067691 | A1 | 3/2015 | Johnson et al. |
| 2016/0005007 | A1 | 1/2016 | Marsico |
| 2016/0072691 | A1 | 3/2016 | Xu et al. |
| 2016/0072704 | A1 | 3/2016 | Angel et al. |
| 2016/0323374 | A1 | 11/2016 | Russinovich et al. |
| 2017/0124737 | A1 | 5/2017 | Joseph et al. |
| 2017/0177253 | A1 | 6/2017 | Hayes et al. |
| 2017/0277620 | A1 | 9/2017 | Kadioglu |
| 2018/0077293 | A1 | 3/2018 | Chai |
| 2018/0097707 | A1 | 4/2018 | Wright et al. |
| 2018/0113804 | A1 | 4/2018 | Hsu et al. |
| 2018/0278647 | A1 | 9/2018 | Gabaev et al. |
| 2019/0004862 | A1 | 1/2019 | Bernat et al. |
| 2019/0068515 | A1 | 2/2019 | Seely et al. |
| 2019/0238635 | A1* | 8/2019 | Ng ........................ G06F 16/954 |
| 2019/0261225 | A1 | 8/2019 | Eswarakava et al. |
| 2019/0348158 | A1 | 11/2019 | Livesay et al. |
| 2020/0014804 | A1 | 1/2020 | Pollak |
| 2020/0112516 | A1 | 4/2020 | Desai |

FOREIGN PATENT DOCUMENTS

| | | |
|---|---|---|
| CN | 103227809 A | 7/2013 |
| CN | 103353867 A | 10/2013 |
| CN | 103369041 A | 10/2013 |
| CN | 105487818 A | 4/2016 |
| CN | 107077387 A | 8/2017 |
| CN | 107743611 A | 2/2018 |
| EP | 3350702 A1 | 7/2018 |
| WO | 2005/079001 A1 | 8/2005 |
| WO | 2008/118608 A1 | 10/2008 |
| WO | 2017/123335 A1 | 7/2017 |

OTHER PUBLICATIONS

Brad Gilmer, "ATM for broadcast", Nov. 1, 2002, TV Tech, pp. 1-5 (Year: 2002).

International Preliminary Report on Patentability received for PCT Patent Application No. PCT/US2019/043970, mailed on Apr. 22, 2021, 10 pages.

International Preliminary Report on Patentability received for PCT Patent Application No. PCT/US2019/043976, mailed on Apr. 22, 2021, 8 pages.

International Preliminary Report on Patentability received for PCT Patent Application No. PCT/US2019/044209, mailed on Apr. 22, 2021, 9 pages.

International Search Report and Written Opinion dated Oct. 2, 2019 in corresponding PCT application PCT/US2019/043970.

International Search Report and Written Opinion issued in Application No. PCT/US2019/044209 dated Oct. 18, 2019.

International Search Report for PCT/US2019/043976 and mailed on Sep. 18, 2019.

Merriam-Webster's Collegiate Dictionary 70 (10th ed. 1993) (Year: 1993).

Office Action dated Jul. 11, 2023 in CN application 201980066423.4.

Slutsky, David J. "The use of tables", 2014, Journal of wrist surgery vol. 3, 4, p. 219. (Year: 2014).

* cited by examiner

Figure 3C

STREAM ALLOCATION USING STREAM CREDITS

FIELD OF THE INVENTION

Embodiments of the present invention relate to systems and methods for allocating resources. More particularly, embodiments of the invention relate to systems and methods for stream or resource allocation. Appendix A forms part of the present disclosure and is incorporated herein in its entirety by this reference.

BACKGROUND

In a single node or a distributed/scaleout cluster environment, allocating resources can be a challenging task. The task is further complicated when attempting to ensure that the resources are allocated fairly to all of the clients using the available resources. For example, any one client should not be able to have an unfairly large share of the available resources. At the same time, there is a need to satisfy quality of service (QOS) requirements.

More specifically, data protection operations (e.g., backup, restore) are often associated with resource allocation issues and quality of service (QOS) issues. These issues arise when some clients are using too many resources and other clients are therefore neglected or unable to acquire the necessary resources. In addition, the QOS often suffers when the demand for resources is more than the node or cluster can bear. To avoid this circumstance or to correct this circumstance, there is a need to throttle requests from any particular client at any particular time. Consequently, systems and methods are needed to fairly allocate resources while, at the same time, ensuring or meeting quality of service requirements.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for performing data protection operations. Examples of data protection operations include, but are not limited to, resource allocation operations including stream allocations, read allocations, segment processing allocations, or the like. Data protection operations may also include backup operations, restore operations, deduplication operations, mirroring operations, data replication operations, and the like or combination thereof.

Embodiments of the invention relate to systems and methods for allocating resources in a computing environment. Embodiments of the invention further relate to systems and methods for measuring and improving quality of service and for throttling clients in the context of resource allocation. Embodiments of the invention further relate to systems and methods for allocating streams to clients, allocating restore credits, for example when performing restore operations, and allocating distributed segment processing (DSP) credits.

In one example, a cluster of servers (or a single server or node) may have resources that can be allocated to clients. These resources include streams, reads, writes, processing, deduplication, or the like. A particular server, for example, may be able to provide x number of streams, or a certain number of reads/writes. As a whole, the cluster can also provide a larger number of streams, reads/writes, and processing. Embodiments of the invention relate to systems and methods for allocating these resources.

Figure 1:
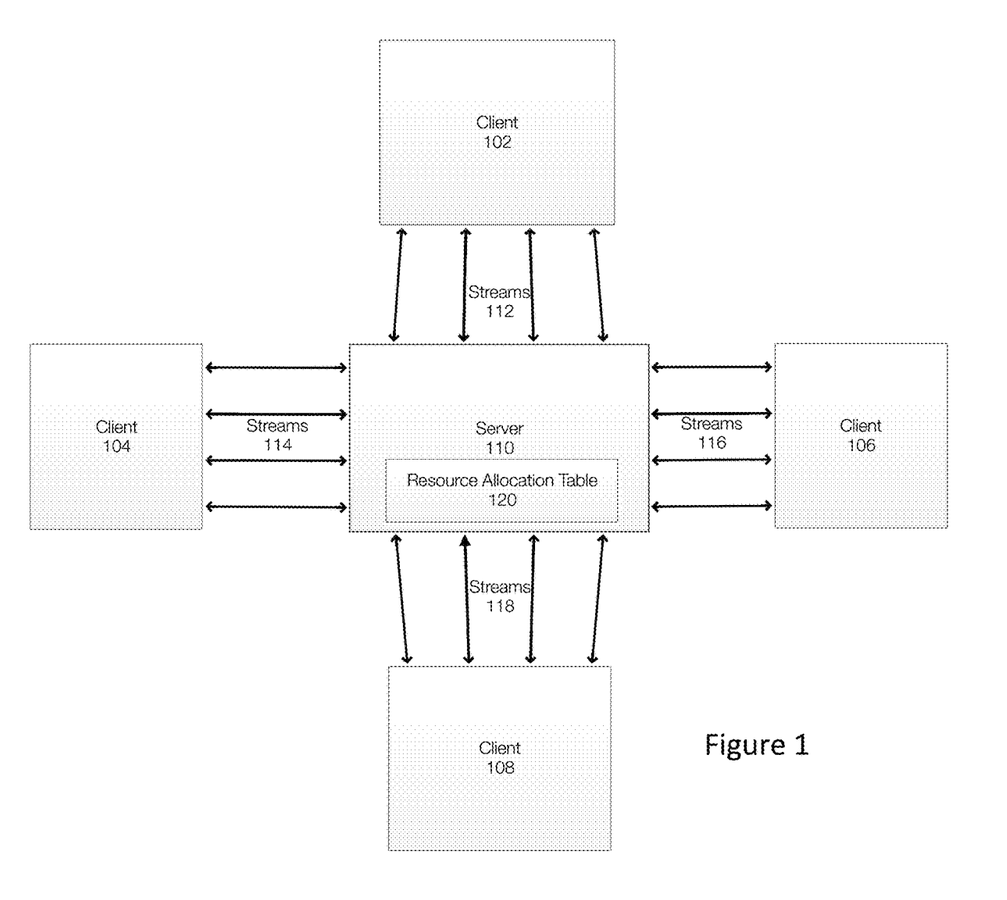
FIG. 1 illustrates an example of a server configured to allocate resources to clients.

FIG. 1 illustrates an example of a computing environment in which clients communicate with a server (or a cluster). In this example, the resources allocated to the client include streams. A client may be able to establish multiple streams with multiple servers. Similarly, a server can establish multiple streams with multiple clients.

These stream resources (and/or other resources including read resources, write resources, processing resources, etc.) are allocated such that the server of cluster operates in a safe allocation state. A safe allocation state is one in which all of the resource requests can be granted and serviced until completion. This is achieved using a credit system. In order to account for multiple scenarios, there are different types of credits that can be granted. Each type, however, may relate to the resources being allocated. The different types of credits effectively represent a different response to credit requests. The credit system can be used to allocate different types of resources and/or to allocate multiple resources at the same time.

For example, the number of credits granted by the server or cluster may be equal to the number of credits requested, less than the number of credits requested, greater than the number of credits requested, zero, or negative. Issuing zero or negative credits allows the server to fully use resources but also throttle when necessary. This also allows the server or cluster to recover from an unsafe state and return to a safe allocation state.

By way of example, the credits may be described as follows:

Prefetch credits: More than the number of credits requested by clients.

Partial credits: Less than (but greater than 0) number of credits requested by clients.

Equal credits: Equal to the number of credits requested by clients.

Zero credits: Equal to zero, indicating, current client request cannot be processed. The client needs to wait and retry obtaining credits.

Negative credits: A negative number, indicating to the client to release the number of cached credits.

The zero and negative credits allow the server to throttle a request from a client.

FIG. 1 illustrates a server (e.g., a data protection or backup server) 110 that provides resources to clients, represented by clients 102, 104, 106 and 108. The server 110 may also represent a cluster of nodes or servers. In one example, the clients 102, 104, 106 and 108 are streaming data (e.g., backup data or streams, restore streams, streams that include data for processing such as deduplication, etc.) to/from the server 110. The client 102, for example, may be backing up a plurality of virtual machines, a database, a file system, or other data type using streams 112. Similarly, the client 104 is associated with streams 114, the client 106 is associated with streams 116, and the client 108 is associated with streams 118.

In this example, the server 110 is configured to allocate streams to the clients 102, 104, 106 and 108. The server 102 is configured to perform stream allocation using, in one example, stream credits. The stream credits can be managed using a resource allocation table 120 that allows the state of allocation (e.g., safe, unsafe) to be determined. Whenever credits are issued (regardless of type), the allocation table 120 is updated so that subsequent requests can be evaluated.

In one example, a request for stream credits is evaluated to determine whether granting the request results in a safe allocation state. Generally, the request is granted if the resulting allocation state is safe. If the request results in an unsafe allocation state, then the request is denied, for example by issuing zero credits or by issuing negative credits.

In the following disclosure and by way of example only, it is assumed that 1 stream available is associated with 1 stream credit granted. In other words and by way of example only, 1 credit represents 1 stream. Other credit per resource allocation schemes could be different. A server may grant x number of streams per credit, for example. The server 110 may grant a stream credit to a requesting client if it is possible for all streams associated with all clients to finish executing.

Because the server 110 may not know when a particular client stream will terminate or how may more stream credits different clients will have requested by the time that the particular client stream finishes, the server 110 may assume that all clients will eventually attempt to acquire their maximum allowed stream credits, use the stream credits, and then release the stream credits.

On these assumptions, the server may determine if the stream allocation state is safe by finding a hypothetical set of stream credit requests by the clients that would allow each client to acquire its maximum requested stream credits and use the stream credits. If there is a state where no such set exists, this may result in the server 110 granting zero stream credits or negative stream credits. This may cause clients that receive these grants or requests to return any stream credits being held. Stated differently, the ability to grant or issue zero credits or negative credits allows the clients to be throttled. In one example, the client may self-throttle because they may not have sufficient credits or because they may need to return credits to the server 110. In this manner, the server then attempts to get back to a safe stream allocation state in order to grant the requested credits.

Embodiments of the invention may allocate resources when the allocation state of the system resulting from a particular allocation is safe. If the proposed allocation results in an unsafe state, then the allocation may be made to return the system to a safe allocation state (e.g., by issuing negative or zero credits). The following discussion, with regard to stream credits, includes the following. This allocation method is described in more detail with regard to FIGS. 3B and 3C described below.

In one example, let C be the number of clients in the system and N be the number nodes or servers in the system.

Total (Maximum Streams) Availability Matrix (TAM): A matrix of length N indicating a maximum number of available stream resources for each node.

TAM[j]=k, there are k instances of stream resource Rj available.

Current Allocation Matrix (CALM): A C×N matrix that defines the number of stream resources currently allocated to each client.

CALM[i,j]=k, then client Ci is currently allocated k instances of stream resource Rj.

Current Availability Matrix (CAM): A matrix of length N indicating the current number of streams available for each node type. This is determined by adding currently allocated streams for all the clients on each individual nodes and subtracting the result from the total maximum streams for that node.

$$CAM[j]=TAM[j]-(CALM[C0]+CALM[C1]+ \ldots + CALM[CN]);$$

Current Demand Matrix (CDM): An C×N matrix that defines the current demand or the point in time maximum requested streams.

If CDM[i,j]=k, then client Ci may request at most k instances of stream resource Rj.

Current Need Matrix (CNM): A C×N matrix indicates the stream credit needs for each clients. (Need=Demand −Allocated).

$$CNM[i,j]=CDM[i,j]-CALM[i,j].$$

At any point of time, the server determines if it is safe to allocate stream credits in response to the client credits requested. The system is in safe state, if at a given point in time, all client credit requests can be satisfied, i.e. for all clients, their stream resource needs are less that the current streams availability for all the nodes in a system.

$$CNM[i,j]<CAM[j]$$

If stream needs of a client is greater than the streams available (CNM[i, j]>CAM[j]), the system is considered unsafe (unsafe allocation state) and negative or zero credits are granted to clients and an effort is made to bring the system to safe/stable stream allocation state.

Figure 2:
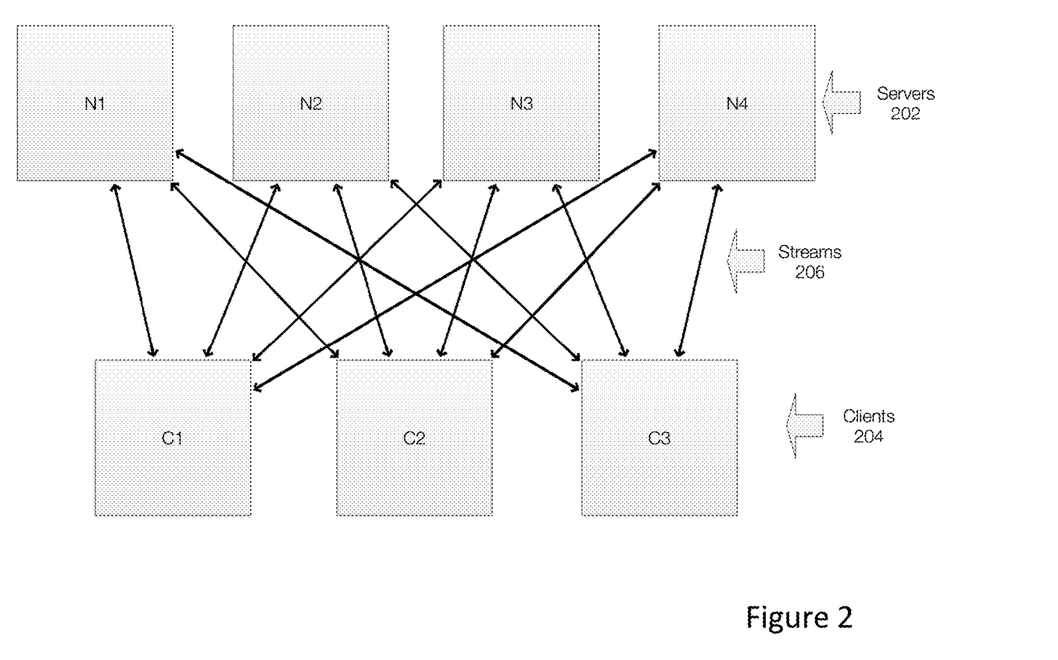
FIG. 2 further illustrates resource allocation including stream allocation in the context of cluster or server resources.

The following examples illustrate this process in more detail. FIG. 2 illustrates a cluster that includes nodes or servers 202 and clients 204. More specifically, FIG. 2 illustrates four nodes or servers: N1, N2, N3 and N4. FIG. 2 also illustrates clients C1, C2 and C3 (clients 204) that use resources of the servers 202. In this example, the resources of the servers 202 allocated to the clients 204 includes streams 206. The streams 206 may include backup streams, restore streams, or other data streams.

As an example, let us assume that in FIG. 2, the TAM or total maximum streams available on each of the nodes is represented as follows:

| N1 | N2 | N3 | N4 |
|----|----|----|----|
| 60 | 50 | 70 | 60 |

Thus, N1 has 60 streams for allocation to clients. Similarly, N2, N3 and N4 have 50, 70 and 60 streams, respectively, for allocation to clients.

The total maximum streams can be determined by considering the number of processors and cores on a server and by determining how much processing power a stream consumes. The total maximum streams can be determined in other ways, such as by testing or by user input.

The CALM matrix below indicates the stream credits that have already been allocated to the client C1-C3. In this example, assume that clients C1, C2 and C3 have the following stream credits already allocated to them.

|      | N1 | N2 | N3 | N4 |
|------|----|----|----|----|
| C1   | 10 | 20 | 20 | 10 |
| C2   | 10 | 00 | 30 | 30 |
| C3   | 10 | 20 | 10 | 00 |

CALM

The CAM or the current streams available (or streams that have not been allocated) can be calculated from the TAM and CALM above. For example: Node N1 has 60 maximum streams that it can allocate from the TAM matrix above. Node N1 has already allocated 10 streams to C1, C2 and C3 respectively. So total streams currently available on N1 is $CAM[N1]=TAM[N1]-(CALM[0,C1]+CALM[0,C2]+CALM[0,C3])$ i.e.

$CAM[N1]=60-(10+10+10)=30.$

Similarly, $CAM[N2]=50-(20+0+20)=10.$ $CAM[N3]=70-(20+30+10)=10.$ $CAM[N4]=60-(10+30+0)=20$

|    | N1 | N2 | N3 | N4 | TAM= |
|----|----|----|----|----|------|
|    | 60 | 50 | 70 | 60 |      |

|    | N1 | N2 | N3 | N4 | CALM= |
|----|----|----|----|----|-------|
| C1 | 10 | 20 | 20 | 10 |       |
| C2 | 10 | 00 | 30 | 30 |       |
| C3 | 10 | 20 | 10 | 00 |       |

|    | N1 | N2 | N3 | N4 | CAM |
|----|----|----|----|----|-----|
|    | 30 | 10 | 10 | 20 |     |

More generally, the CAM identifies which nodes or servers are providing the streams allocated to the clients 204. As previously stated, the clients 204 can connect to any of the servers 202 and can therefore request credits from any of the servers 202 in the cluster.

The following CDM defines the maximum client stream credit request at a given point in time. In other words, the following matrix defines how many streams each client can request from each of the servers at a given point in time. These numbers or maximums can be predetermined and set by an administrator. Further, these numbers may be dynamic and may be based on the number of clients and/or the number of servers. As the numbers of servers and clients changed, the point in time stream credit request numbers may change.

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |

CDM

By subtracting Current Allocated streams Matric (CALM) from Current Demand Matrix (CDM), the total stream credit needed or the CNM for C1, C2 and C3 can be determined as follows:

|    | N1 | N2 | N3 | N4 |   |    | N1 | N2 | N3 | N4 |   |    | N1 | N2 | N3 | N4 |
|----|----|----|----|----|---|----|----|----|----|----|---|----|----|----|----|----|
| C1 | 30 | 30 | 20 | 20 | − | C1 | 10 | 20 | 20 | 10 | = | C1 | 20 | 10 | 00 | 10 |
| C2 | 10 | 20 | 30 | 40 |   | C2 | 10 | 00 | 30 | 30 |   | C2 | 00 | 20 | 00 | 10 |
| C3 | 10 | 30 | 50 | 00 |   | C3 | 10 | 20 | 10 | 00 |   | C3 | 00 | 10 | 40 | 00 |
|    |    | CDM |   |   |   |    |    | CALM |  |    |   |    |    | CNM |  |    |

Using the above information, it is possible to determine whether each client can acquire and use its maximum requested stream credits. The following format is used in the following discussion <xx xx xx xx> represents streams associated with, respectively, nodes N1, N2, N3 and N4.

For example, from the CNM, C1 requests and acquires 20 N1 stream credits, 10 N2 stream credits and 10 N4 stream credits to achieve is maximum requested credits. The server may perform this determination prior to actually granting the request.

After C1 requests and acquires the available streams are now determined as follows:

<30 10 10 20> (CAM or available streams) −
<20 10 00 10> (streams acquired by C1 to reach C1's max) =
<10 00 10 10> (Streams still available)

Thus, the cluster still has 10 N1 streams, 00 N2 streams, 10 N3 streams and 10 N4 streams available.

Next, C1 terminates the processes associated with the streams and returns 30 N1, 30 N2, 20 N3 and 20 N4 stream credits back to the system. These are the streams associated with the C1 row in the CDM. Adding it to the streams currently available

<10 00 10 10>+<30 30 20 20>=<40 30 30 30>

As a result, the cluster now has 40 N1, 30 N2, 30 N3, and 30 N4 total streams available. This <40 30 30 30> is less than or equal to the TAM <60 50 70 60> or the total maximum stream for each node of the cluster i.e.

<40 30 30 30><=<60 50 70 60> so the system state is safe to allocate and to process next client request.

C2 now acquires 20 N1 streams and 10 N4 streams. C2 then terminates and returns all of its stream credits. In this example and after these steps, the available streams are or equals:

[0051] <40 30 30 30> (streams currently available prior to C2's request) −
[0052] <00 20 00 10> (streams acquired by C2 to reach C2's max) =
[0053] <40 30 30 30> − < 00 20 00 10> = < 40 10 30 20> (streams still available) +
[0054] <10 20 30 40> (streams associated with the C2 row in the CDM)
<10 20 30 40> + <40 10 30 20> = < 50 30 60 60> (streams available after C2 returns stream credits).

This <50 30 60 60> is less than or equal to the TAM <60 50 70 60> or the total maximum stream for each node of the cluster i.e.
<50 30 60 60><=<60 50 70 60> so the system state is safe to allocate and process to process next client request.

Next, C3 acquires 10 N2 and 40 N3 streams, terminates and returns all streams (returns stream credits). This results in the following:

|    | N1 | N2 | N3 | N4 |
|----|----|----|----|----|
| C1 | 10 | 20 | 20 | 10 |
| C2 | 10 | 00 | 30 | 30 |
| C3 | 10 | 20 | 20 | 00 |

CALM

[0056] <50 30 60 60> (currently available streams prior to C3's) −
[0057] <00 10 40 00> (streams acquired by C3 to reach C3's max) +
[0058] <10 30 50 00> (streams returned by C3) =
[0059] <60 50 70 60> (stream credits available).
This <60 50 70 60> is less than or equal to the TAM <60 50 70 60> or the total maximum stream for each node of the cluster i.e.
<60 50 70 60> <= < 60 50 70 60> so the system state is safe to allocate and process to process next client request.

This demonstrates that because it is possible for each client to acquire its maximum requested stream credits and use the stream credits, the stream allocation states are safe and stream credits can be granted to all clients as described above.

A stream allocation safe state indicates that stream credits can be granted or issued. Embodiments of the invention contemplate several different kinds of credits that can be requested and granted.

The following examples illustrate these types of credits and illustrates whether the credits are granted.

Now, the clients maximum requested streams is as follows:

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |

CDM

With this information, a determination can be made as to whether the new stream allocation state is safe.

|    | N1 | N2 | N3 | N4 |    |    | N1 | N2 | N3 | N4 |    |    | N1 | N2 | N3 | N4 |
|----|----|----|----|----|----|----|----|----|----|----|----|----|----|----|----|----|
| C1 | 30 | 30 | 20 | 20 | −  | C1 | 10 | 20 | 20 | 10 | =  | C1 | 20 | 10 | 00 | 10 |
| C2 | 10 | 20 | 30 | 40 |    | C2 | 10 | 00 | 30 | 30 |    | C2 | 00 | 20 | 00 | 10 |
| C3 | 10 | 30 | 50 | 00 |    | C3 | 10 | 20 | 20 | 00 |    | C3 | 00 | 10 | 30 | 00 |

CDM                        CALM                        CNM

Example 1: A Server Grants "Equal" Credits

Starting in the same state as the previous example started in, assume C3 requests 10 streams credits on node N3. In this example, there are enough available streams such that the credit request can be granted. After the grant, the new stream allocation state is as follows:

CAM or the Available Streams on Nodes:

|                   | N1 | N2 | N3 | N4 |
|-------------------|----|----|----|----|
| Available Streams | 30 | 10 | 00 | 20 |

The CALM streams currently allocated to the clients 204 is now as follows (this assumes that C3's request for 10 N3 credits is granted):

In the above example, C1 can acquire 20 N1, 10 N2 and 10 N4 streams, use them and release them. Then, C2 can acquire 20 N2 and 10 N4 streams, use them and release them. Finally, C3 can acquire 10 N2 and 30 N3 streams, use them and then release them. Therefore, this new allocation state is safe.

Because the new state is safe, the request from C3 for 10 streams credits on node N3 is granted. This is an example of a server granting stream credits equal to the number of stream credits requested by the client.

Example 2: Server Grants "Partial" Credits

Starting in the same state that the previous example started in, assume C3 requests 20 streams credits on N3. In this example, the streams available before granting the requested stream credits is as follows:

| N1 | N2 | N3 | N4 |
|----|----|----|----|
| 30 | 10 | 10 | 20 |

The streams available after granting the stream credits is as follows:

| N1 | N2 | N3  | N4 |
|----|----|-----|----|
| 30 | 10 | −10 | 20 |

Because the number of total streams available after the grant is less than zero, the server may decide to grant 10 stream credits (which is a partial grant because 20 stream credits were requested). As previously stated with respect to the previous example, granting 10 stream credits to C3 from N3 results in a safe allocation state. This illustrates an example of a partial grant of stream credits.

Example 3: "Zero" or "Negative" Stream Credit Allocation

From the previous starting state, assume that client C2 requests 10 stream credits from node N2. In this example, there are enough streams to grant stream credits. Assuming that the request is granted, the new state would be:
CAM or the Available Streams on Nodes:

|                   | N1 | N2 | N3 | N4 |
|-------------------|----|----|----|----|
| Available Streams | 30 | 00 | 10 | 20 |

The CALM or currently allocated streams according to the initial state:

|    | N1 | N2 | N3 | N4 |
|----|----|----|----|----|
| C1 | 10 | 20 | 20 | 10 |
| C2 | 10 | 10 | 30 | 30 |
| C3 | 10 | 20 | 10 | 00 |
|    |    | CALM |  |  |

The CDM or the point in time maximum requested streams is determined as follows:

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |
|    |    | CDM |  |  |

Now a determination is made to determine if the new allocation state is safe. Assuming that clients C1, C2 and C3 request more stream credits from N2 and N3.

|    | N1 | N2 | N3 | N4 |   |    | N1 | N2 | N3 | N4 |   |    | N1 | N2 | N3 | N4 |
|----|----|----|----|----|---|----|----|----|----|----|---|----|----|----|----|----|
| C1 | 30 | 30 | 20 | 20 | − | C1 | 10 | 20 | 20 | 10 | = | C1 | 20 | 10 | 00 | 10 |
| C2 | 10 | 20 | 30 | 40 |   | C2 | 10 | 10 | 30 | 30 |   | C2 | 00 | 10 | 00 | 10 |
| C3 | 10 | 30 | 50 | 00 |   | C3 | 10 | 20 | 10 | 00 |   | C3 | 00 | 10 | 40 | 00 |
|    |    | CDM |  |  |   |    |    | CALM |  |  |   |    |    | CNM |  |  |

In this case, C1 is unable to acquire enough streams from N2 i.e. from the CNM above, it needs 10 streams from N2. However, according to the CAM above, the number of streams available for N2 is 0. Also, C2 is unable to acquire enough streams from N2, and C3 is unable to acquire enough streams from N2.

None of the clients in this example can acquire enough stream credits to achieve their maximum allowed stream credits. As a result, this state is not safe and the server 202 may throttle one or more of the clients 204 and recover from the unsafe allocation state by issuing negative credits. In other words, the servers 202 recover from this unsafe state by throttling and issuing negative credits.

For example, the server N2 may grant negative 20 stream credits to C1. Optionally, N2 grants zero credits to clients C2 and C3 (i.e., clients C2 and C3 throttle and retry their requests after some time). Client C1 returns the 20 stream credits it holds to N2 and the safe allocation state check is performed to determine if the state is safe.

Stream credits are used to perform resource allocation. The stream allocation method can be applied to many types of streams. The stream allocation method may maintain stable stream allocation states by granting negative/zero credits to various clients. Further, embodiments of the invention allow for different types of credit grants as previously described.

More specifically, stream credits may be prefetched. If a client holds no stream credits (or even if the client holds some stream credits) and if there are enough free streams on the server, the server can grant the client more credits then requested.

Prefetching credits may be requested, for example based on anticipated workloads. This may apply, for example, during a restore operation where the stream credits are used in anticipation of restoring a stream by reading a backup.

Granted credits can also be used to make decisions related to the sizing of the client size cache. This relates, for example, to reading ahead with stream credits used for the restore operation, performing an intelligent read ahead, or using credits to manage the cost of a solution.

A partial grant of credits can allow operations to be partially completed. Further, stream credits can be retrieved from the clients by issuing negative credits and flushing the number of negative credits from a client's cache. In other words, a client may be throttled if the number of granted credits is zero or negative. Further different credit allocation methods may be implemented based on the type of credits requested.

Figure 3A:
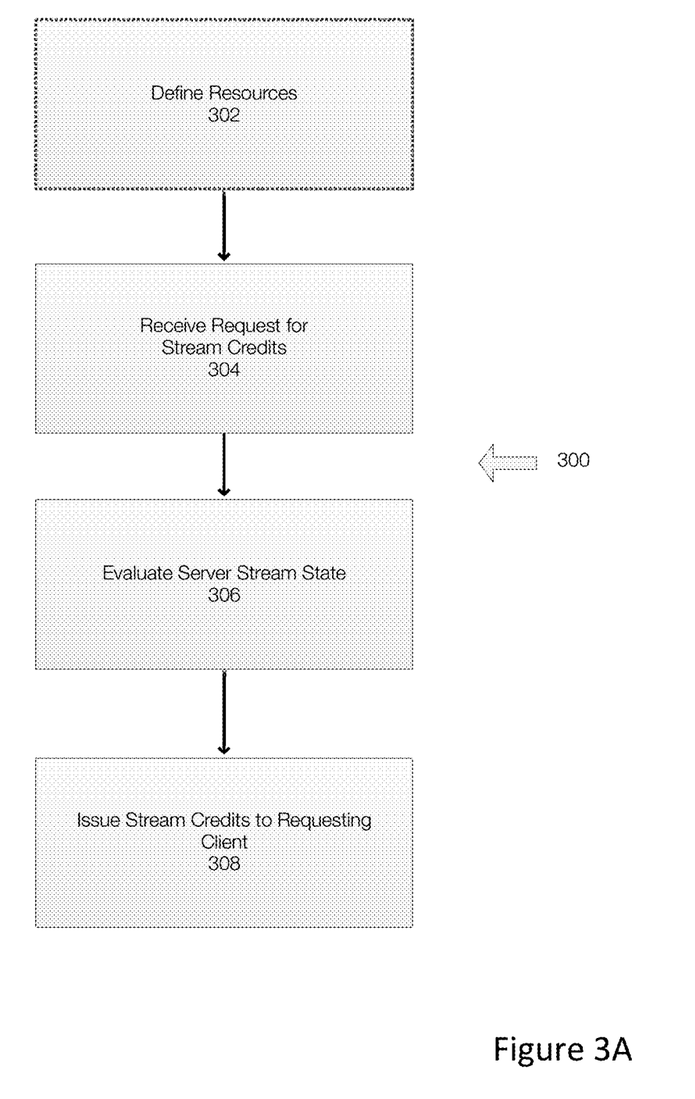
FIG. 3A illustrates an example of a method for performing resource allocation and in particular for allocating streams in a computing environment.

FIG. 3A illustrates an example of a method for performing resource allocation. In one example, various parameters associated with the resource allocation may be defined 302 or determined. For example, a determination may be made regarding how many streams each node or server can safely support. This may be based on number of processors/cores, memory, write/read parameters or the like. For example, a relationship between writes, processor or core consumption may be determined. If a predetermined number of writes or a data transmission rate consumes 1% of a CPU, then a stream at that transmission rate may correspond to 1 credit. Also, the maximum number of streams allowed per client may be determined.

This aspect of the method 300 may be performed at a single time. However, this aspect of the method 300 can be reevaluated as nodes are added/removed or as clients are added/removed from the system. These values may also account for other functions performed by the servers 202 that may not involve streams or that may not involve the particular resource being allocated. Further, these values may be able to vary based on other factors such as time of day. For example, when the processor is not required for other tasks such as during a slower period, it may be possible to temporarily increase the number of available streams.

Once the resource allocations have been defined and the server is allocating resources to the clients, the method 300 enforces or performs the allocation method. For example, a request for stream credits may be received 304. This request is evaluated as discussed previously to determine whether the requested allocation results in a safe allocation state. Thus, the server may evaluate 306 the stream state or the allocation state by hypothetically granting the request. This involves considering whether the other clients could still be allocated their maximum credits. As previously stated, in one embodiment, it is assumed that clients may ultimately request, use and release their maximum credits allowed. The evaluation thus determines what the allocation state would be if the request were granted.

The server then issues credits 308 according to the result (the determined allocation state) to the requesting client (and/or to other clients). If the allocation state is safe, the server may issue credits equal to the request or greater than equal to the request. If the allocation state is not safe, a partial grant may occur that still results in a safe allocation state. If the allocation state is not safe, the server may issue zero or negative credits. In one example, the zero and/or negative credits could be issued to any of the clients.

Figure 3B:
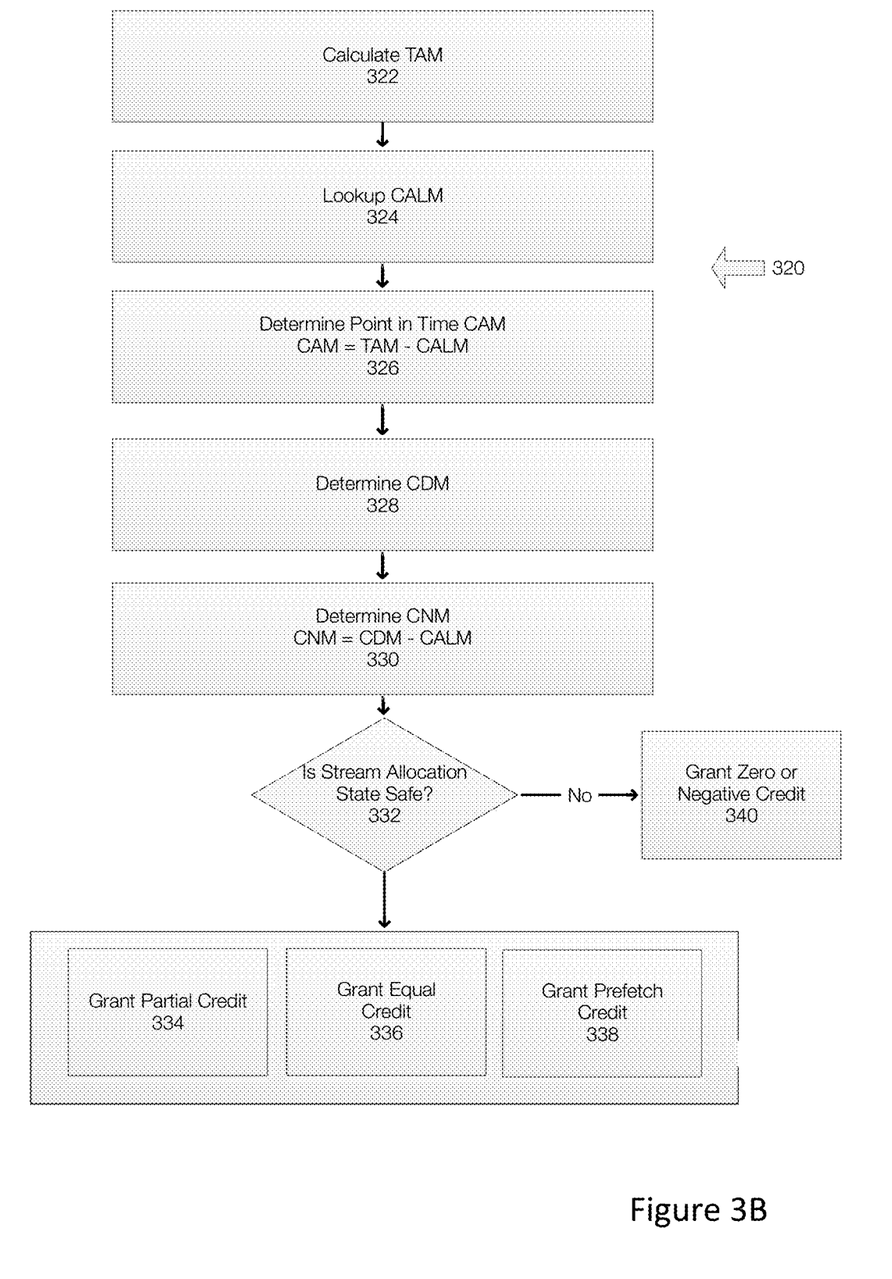
FIG. 3B illustrates an example of a method for evaluating a stream allocation state of a node or a server or a cluster.

FIG. 3B illustrates an example of evaluating the stream state in more detail. More specifically, FIG. 3B illustrates an example of evaluating the server stream state 306 shown in FIG. 3A. Thus, the method 320 illustrates an example of evaluating the server stream state 306. In an example of the method 320, the server may calculate the TAM 322, which determines the total streams available. The server may then lookup the CALM 324. The CALM identifies the streams that are currently allocated to the clients.

Next, the point in time CAM is determined 326. This is determined by subtracting the CALM from the TAM (CAM=TAM−CALM). This allows the server to determine how many streams are available for allocation. This can be determined from the perspective of the system as whole and/or on an per node or per server basis. As discussed above, the number of available streams may be determined on a per server basis. In one example, this ensures that the resources of a particular server are not overtaxed. Plus, in one embodiment, this may give the server or cluster flexibility in determining which servers provide or allocate resources. For example, it may be possible for a server to redirect a request to a different server if the redirection would result in a safe allocation state.

Next, the CDM is determined 328 and the CNMs determined 330 by subtracting the CALM from the CDM (CNM=CDM−CALM).

After this information has been determined, a determination 332 is made as to whether the stream allocation state is safe or unsafe. If the stream allocation state is not safe, then zero or negative credits are granted 340. If the stream allocation state is safe, then credits are granted. For example, partial credits may be granted 334, equal credits may be granted 336, or prefetch credits may be granted 338. The credits are then issued 308. In one example, issuing credits 308 may be part of the method 320 and is incorporated into the granting of credits 334, 336, 338 or 340.

Figure 3C:
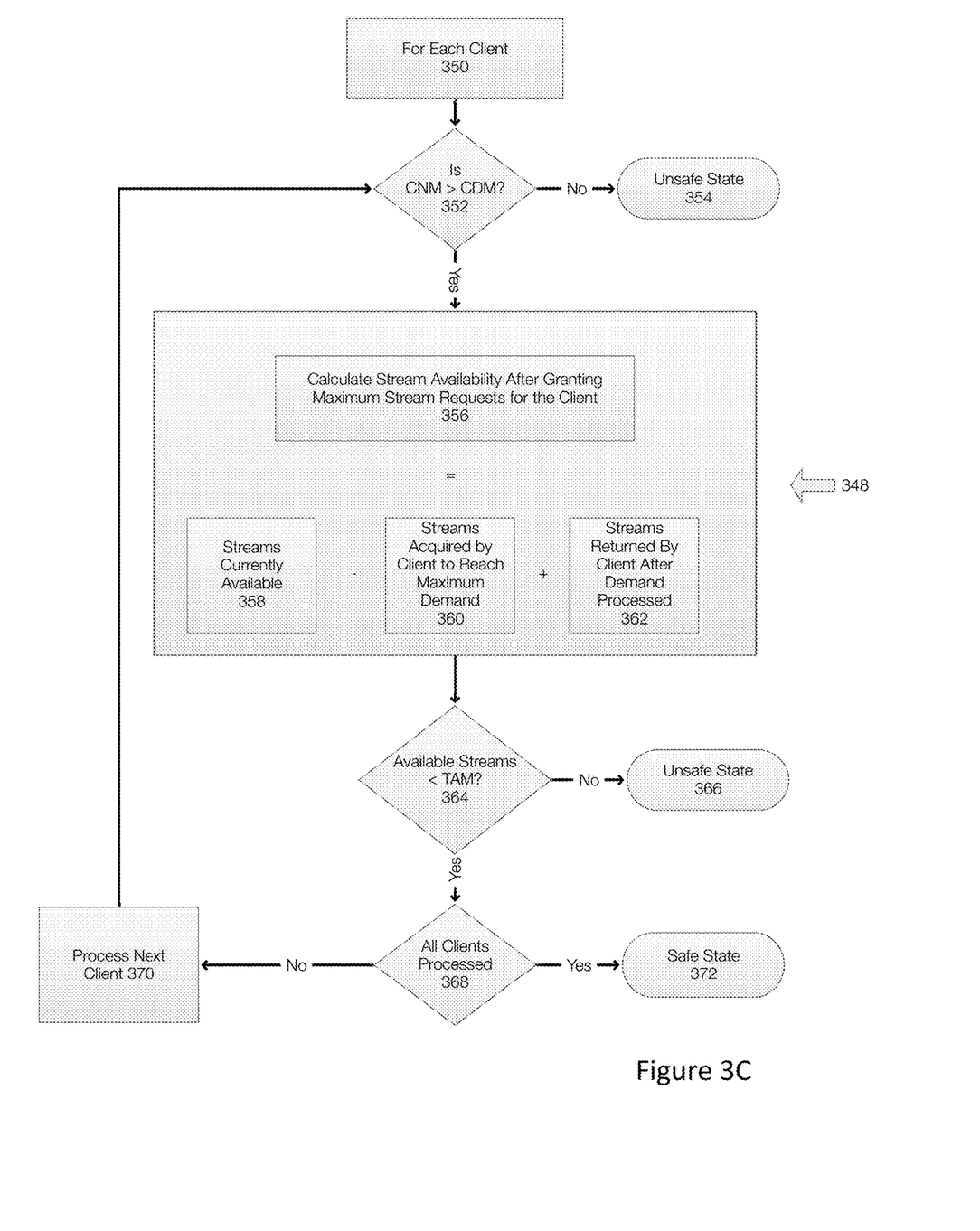
FIG. 3C further illustrates the method for evaluating the stream allocation state of FIG. 3B.

FIG. 3C illustrates an example of determining a stream allocation state. More specifically, FIG. 3C illustrates an example of determining if the stream allocation state is safe 332 in FIG. 3B. The method 348 may be performed for each client 350. Staring with a first client 350, a determination is made to determine 352 if CNM is greater than CDM. Thus, if the current need is not greater than the current demand, then the state is unsafe 354 and negative or zero credits are issued or granted as shown in FIG. 3B.

When the CNM is greater than the CDM, then the stream availability after granting the maximum stream requests for the client is determined 356. This computation may be performed as if the requested credits were granted to determine whether the resulting state is safe. Further, all clients, in one embodiment, are evaluated as a whole to determine whether the stream allocation state is safe.

In one example, the stream availability (356) is determined by subtracting the streams acquired by the client to reach the client's maximum demand 360 from the number of streams currently available 358 (this may be done as a whole or on a per server or node basis). This result is then added to the streams returned by the client after the demand is processed 362. In other words, the system evaluates the state assuming, in one example, that the clients requested and are granted their maximum possible streams.

Based on this determination 356, a determination is made as to whether the available streams is less than the total available matrix 364. If not, the state is unsafe 366. If so and all clients have been processed 368, the state is safe 372 and the credits can be granted as shown in FIG. 3B. If all clients are not processed, the next client is processed 370.

FIGS. 3A-3C thus illustrate an example of a method for allocating resources such that the allocation state of the system is safe. When a proposed allocation of resources (e.g., a request from a client) results in an unsafe allocation state, then the allocation may be zero or negative, which allows the system to either avoid an unsafe allocation state or return to a safe allocation state.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allocating resources of a cluster of servers, the method comprising:
predetermining maximum stream credits associated with each client of the cluster of servers;
receiving a request for stream credits from a client at the cluster, wherein the stream credits are for using streams provided by the cluster of servers;
determining, by the cluster, an allocation state of the cluster in response to the request for stream credits from the client, wherein the cluster has a number of stream resources, wherein the allocation state is unsafe when the streams allocated by the cluster exceeds the number of stream resources,
wherein determining the allocation state includes:
determining a number of streams available from the cluster;
assuming that the request for stream credits is granted; and
determining whether at least one other client could request and use their maximum stream credits;
wherein the allocation state of the cluster is safe when the at least one other client can request and use their maximum stream credits without exceeding the number of stream resources and wherein the allocation state of the cluster is unsafe when the at least one other client cannot request and use their maximum stream credits without exceeding the number of stream resources;
issuing, by the cluster, the stream credits to the client in response to the request for stream credits based on the allocation state; and
providing streams to the client according to the stream credits issued to the client, wherein the client uses the provided streams.

2. The method of claim 1, further comprising streaming one or more streams to the clients, wherein each of the one or more streams consumes resources of the cluster of servers.

3. The method of claim 1, further comprising determining a current allocation matrix that identifies streams currently allocated to each of the clients from each of the servers in the cluster of servers.

4. The method of claim 3, further comprising determining a current demand matrix that specifies a maximum number of streams that can be requested by each of the clients from each of the servers in the cluster of servers.

5. The method of claim 4, further comprising determining a current need matrix based on the current demand matrix and the current allocation matrix, wherein the current need matrix identifies a number of stream credits that each of the clients can request to acquire their maximum number of stream credits.

6. The method of claim 1, further comprising defining a maximum number of streams for allocation for each of the servers, wherein the maximum number of streams for each of the servers is based on a number of write or read parameters.

7. The method of claim 1, wherein each stream credit corresponds to a percentage of a CPU (central processing unit), percent of CPU consumed by a data transmission rate, or a percent of CPU consumed by a predetermined number of writes.

8. The method of claim 1, wherein issuing the stream credits based on the allocation state includes at least one of:

issuing stream credits in an amount equal to the request when the allocation state is safe; and when the allocation state is unsafe, issuing stream credits in an amount greater than the request;

issuing stream credits in an amount greater than zero and less than the request;

issuing zero stream credits; or issuing negative stream credits.

9. The method of claim 1, further comprising:

throttling the client when the allocation state is not safe until the allocation state is safe; or self-throttling by the clients.

10. A method for allocating resources of a cluster of servers, the method comprising:

predetermining maximum credits associated with each client of the cluster of servers;

receiving a request for credits from a client at the cluster, wherein the credits are for using resources provided by the cluster of servers;

determining, by the cluster, an allocation state of the cluster in response to the request for credits from the client, wherein the cluster has a number of resources, wherein the allocation state is unsafe when the resources allocated by the cluster exceeds the number of resources, wherein determining the allocation state includes:

determining resources available from the servers;

assuming that the request for credits is granted; and determining whether at least one other client could request and use their maximum credits;

wherein the allocation state of the cluster is safe when the at least one other client can request and use their maximum credits without exceeding the number of resources and wherein the allocation state of the cluster is unsafe when the at least one other client cannot request and use their maximum credits without exceeding the number of resources;

issuing the credits, by the cluster, to the client in response to the request for credits based on the allocation state; and providing resources to the client according to the credits issued to the client, wherein the client uses the provided resources.

11. The method of claim 10, further comprising streaming one or more streams to the clients, wherein each of the one or more streams consumes resources of the cluster of servers.

12. The method of claim 10, further comprising determining a current allocation matrix that identifies resources currently allocated to each of the clients from each of the servers in the cluster of servers.

13. The method of claim 12, further comprising determining a current demand matrix that specifies a maximum number of resources that can be requested by each of the clients from each of the servers in the cluster of servers.

14. The method of claim 13, further comprising determining a current need matrix based on the current demand matrix and the current allocation matrix, wherein the current need matrix identifies a number of credits that each of the clients can request to acquire their maximum number of credits.

15. The method of claim 10, further comprising defining a maximum amount of resources for allocation for each of the servers, wherein the maximum amount of resources for each of the servers is based on a number of write or read parameters.

16. The method of claim 10, wherein each credit corresponds to a percentage of a CPU (central processing unit), percent of CPU consumed by a data transmission rate, or a percent of CPU consumed by a predetermined number of writes.

17. The method of claim 10, wherein issuing the credits based on the allocation state includes at least one of:

issuing credits in an amount equal to the request when the allocation state is safe; and when the allocation state is unsafe, issuing credits in an amount greater than the request;

issuing credits in an amount greater than zero and less than the request;

issuing zero credits; or issuing negative credits.

18. The method of claim 10, wherein:

the credits are stream credits for performing streaming operations with the resources;

the credits are restore credits for performing restore operations with the resources; or the credits are distributed segment processing credits for performing distributed segment processing operations with the resources.

19. The method of claim 18, wherein the resources include one or more of streams, reads, writes, processing, or deduplication.

20. A non-transitory computer readable medium including instructions for implementing a method for allocating resources of a cluster of servers when performing a data protection operation, the method comprising:

predetermining maximum stream credits associated with each client of the cluster of servers;

receiving a request for stream credits from a client at the cluster, wherein the stream credits are for using streams provided by the cluster of servers;

determining, by the cluster, an allocation state of the cluster in response to the request for stream credits from the client, wherein the cluster has a number of stream resources, wherein the allocation state is unsafe when the streams allocated by the cluster exceeds the number of stream resources, wherein determining the allocation state includes:

determining a number of streams available from the cluster;

assuming that the request for stream credits is granted; and determining whether at least one other client could request and use their maximum stream credits;

wherein the allocation state of the cluster is safe when the at least one other client can request and use their maximum stream credits without exceeding the number of stream resources and wherein the allocation state of the cluster is unsafe when the at least one other client cannot request and use their maximum stream credits without exceeding the number of stream resources;

issuing, by the cluster, the stream credits to the client in response to the request for stream credits based on the allocation state; and providing streams to the client according to the stream credits issued to the client, wherein the client uses the provided streams.

* * * * *